(12) United States Patent
Lee

(10) Patent No.: US 7,252,321 B2
(45) Date of Patent: Aug. 7, 2007

(54) ELECTRIC CAR SUNSHADE

(76) Inventor: Tien Chu Lee, No. 102, Health Road, Taipei (TW)

( * ) Notice: Subject to any disclaimer, the term of this patent is extended or adjusted under 35 U.S.C. 154(b) by 268 days.

(21) Appl. No.: 11/113,435

(22) Filed: Apr. 25, 2005

(65) Prior Publication Data

US 2005/0236863 A1   Oct. 27, 2005

(30) Foreign Application Priority Data

Apr. 27, 2004 (TW) ................. 93111740 A

(51) Int. Cl.
*B60J 3/00* (2006.01)
(52) U.S. Cl. .............. 296/97.4; 296/97.7; 296/97.8; 160/370.22
(58) Field of Classification Search ............. 296/97.1, 296/97.4, 97.7, 97.8, 97.9, 97.11; 160/DIG. 2, 160/DIG. 3, 370.22, 370.23, 370.21
See application file for complete search history.

(56) References Cited

U.S. PATENT DOCUMENTS

| 2,585,769 | A | * | 2/1952 | Hamlin | 160/120 |
| 5,085,473 | A | * | 2/1992 | Yang | 296/141 |
| 5,947,544 | A | * | 9/1999 | Hubeshi | 296/97.4 |
| 6,086,133 | A | * | 7/2000 | Alonso | 296/97.8 |
| 6,267,431 | B1 | * | 7/2001 | Watkins | 296/97.4 |
| 6,318,789 | B1 | * | 11/2001 | Stuart | 296/97.8 |
| 6,983,786 | B2 | * | 1/2006 | Chen | 160/370.22 |
| 2002/0033244 | A1 | * | 3/2002 | Schlecht et al. | 160/370.22 |

* cited by examiner

*Primary Examiner*—Jason S Morrow

(57) ABSTRACT

A car sunshade includes: a pair of curtain members each hung to a hanger and operatively driven by a driving device to be upwardly unwound for shielding the windshield of the car from being exposed to sun light along a pair of guiding devices respectively mounted on (or juxtapositioned to) two pillars adjacent to the windshield; or the curtain members being downwardly wound to unveil the windshield of the car, without removing a factory-installed rear-view mirror and without obstructing a driver's head.

9 Claims, 6 Drawing Sheets

ELECTRIC CAR SUNSHADE

BACKGROUND OF THE INVENTION

U.S. Pat. No. 6,318,788 disclosed a motorized automobile sunshade for selectively raising or lowering a sunscreen on the windshield of an automobile. However, it has the following drawbacks:

1. An original factory-installed rear view mirror must be removed from the windshield. Then, the sunshade can be installed, thereby causing inconvenience for the user.

2. The windshield is not a regular rectangular shape. The rectangular screen (30) of the prior art may not accommodate to the arcuate windshield, influencing its sun-shielding effect.

3. The housing (10) is secured to the ceiling of the automobile to possibly obstruct a driver's head especially when he or she is a tall person.

The present inventor has found the drawbacks of the conventional automobile sunshade and invented the present electric car shade.

SUMMARY OF THE INVENTION

The object of the present invention is to provide a car sunshade including: a pair of curtain members each hung to a hanger and operatively driven by a driving device to be upwardly unwound for shielding the windshield of the car from being exposed to sun light along a pair of guiding devices respectively mounted on (or juxtapositioned to) two pillars adjacent to the windshield; or the curtain members being downwardly wound to unveil the windshield of the car, without removing a factory-installed rear-view mirror and without obstructing a driver's head.

DETAILED DESCRIPTION

Figure 1:
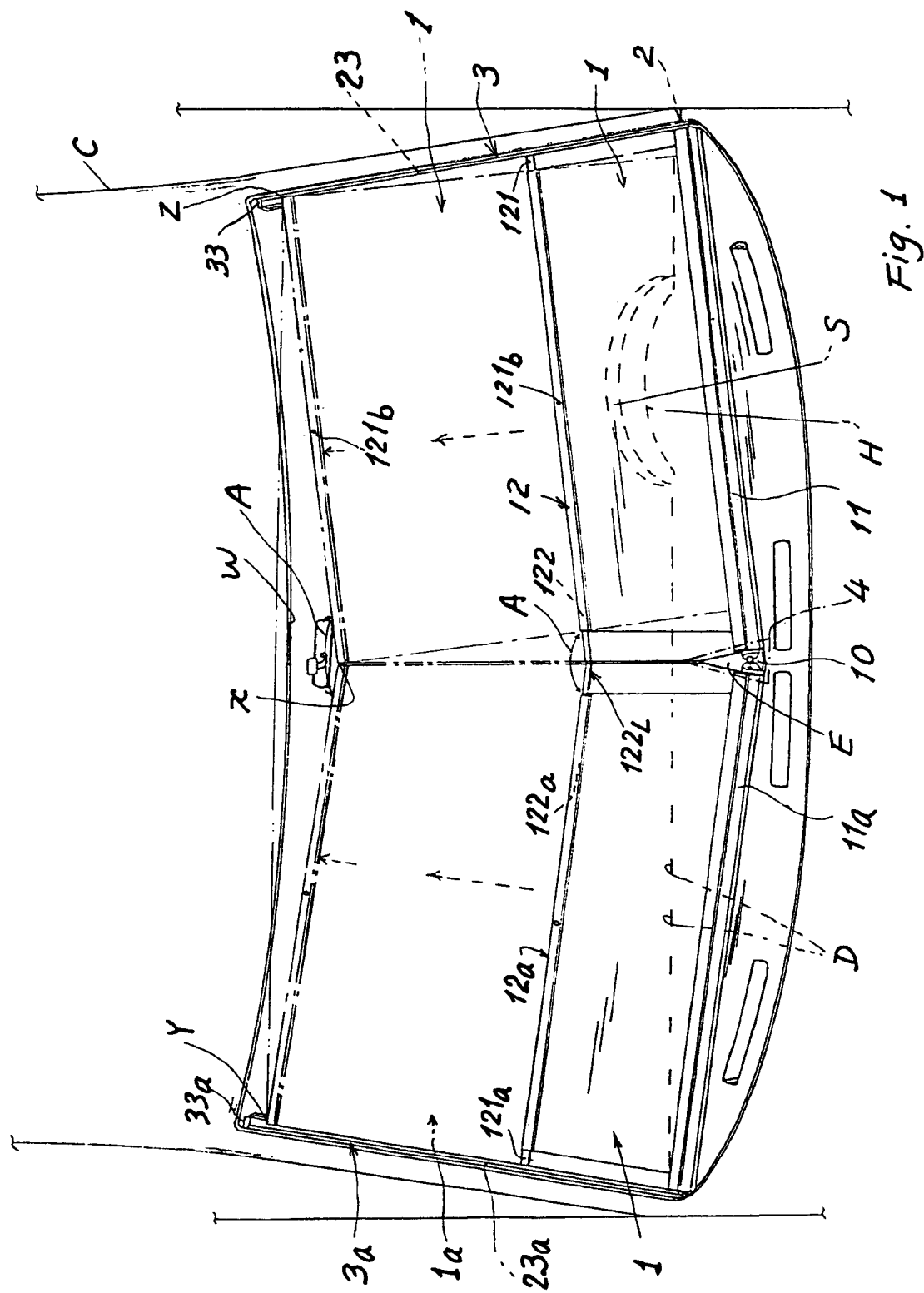
FIG. 1 is an illustration showing the present invention from a front view of a car.

As shown in the drawing figures, the car sunshade of the present invention comprises: a pair of curtain members 1, 1a disposed on a right portion and a left portion of a car windshield W when extended or unwound; at least a driving means 2 operatively unwinding the curtain members 1, 1a for shielding the windshield W of the car C; a pair of guiding devices (or means) 3, 3a disposed on opposite sides of the windshield W adjacent (or secured) to two windshield pillars of the car for guiding the curtain members 1, 1a when operatively unwound or wound.

Naturally, two driving means, respectively juxtapositioned to the two guiding devices 3, 3a, may also be provided on opposite sides of the windshield for respectively driving the two curtain members 1, 1a.

The two curtain members 1, 1a cooperatively define an obtuse angle A therebetween such as a triangle XYZ as shown in FIG. 1 to protrude or taper forwardly to approach the windshield W as much as possible. Such an obtuse angle A is especially designed for the car having a high protrusion H on the dashboard D near the steering wheel S as shown in FIG. 1 so as to be deviated from (or uninfluenced by) such a protrusion H. Otherwise, if the sunshade is formed as a flat single sheet sunshade, it may be obstructed by such a protrusion H when downwardly retracted or rewound.

Since the two curtain members 1, 1a are symmetrically disposed on a right and a left portion of the windshield, one said curtain member 1 is taken for illustration purpose as described hereinafter.

The curtain member 1 is generally formed as trapezoidal shape to be corresponding to the windshield formed as trapezoidal shape and includes a lower reel 11 rotatably mounted on the dashboard D adjacent to the windshield having a lower portion of the curtain member secured to the reel 11, and an upper hanger 12 secured to the driving means 2 formed on one said guiding device 3 for securing an upper portion 1u of the curtain member 1.

A universal coupling 10 is provided for universally coupling the two lower reels 11, 11a of the two curtain members 1, 1a to be simultaneously driven by the driving means 2.

The lower reel 11 is rotatably mounted in a hollow sleeve 110s secured on two reel holders 111, 112 disposed on opposite ends of the reel 11. The first reel holder 111 is adjacent to the universal coupling 10, while the second reel holder 112 is secured to a lower end portion 32 of the (or the right) guiding means 3.

A decorative plate 110 may be provided for shielding the reel 11 and the curtain member 1 when wound or retracted into the sleeve 110s.

Figure 3:
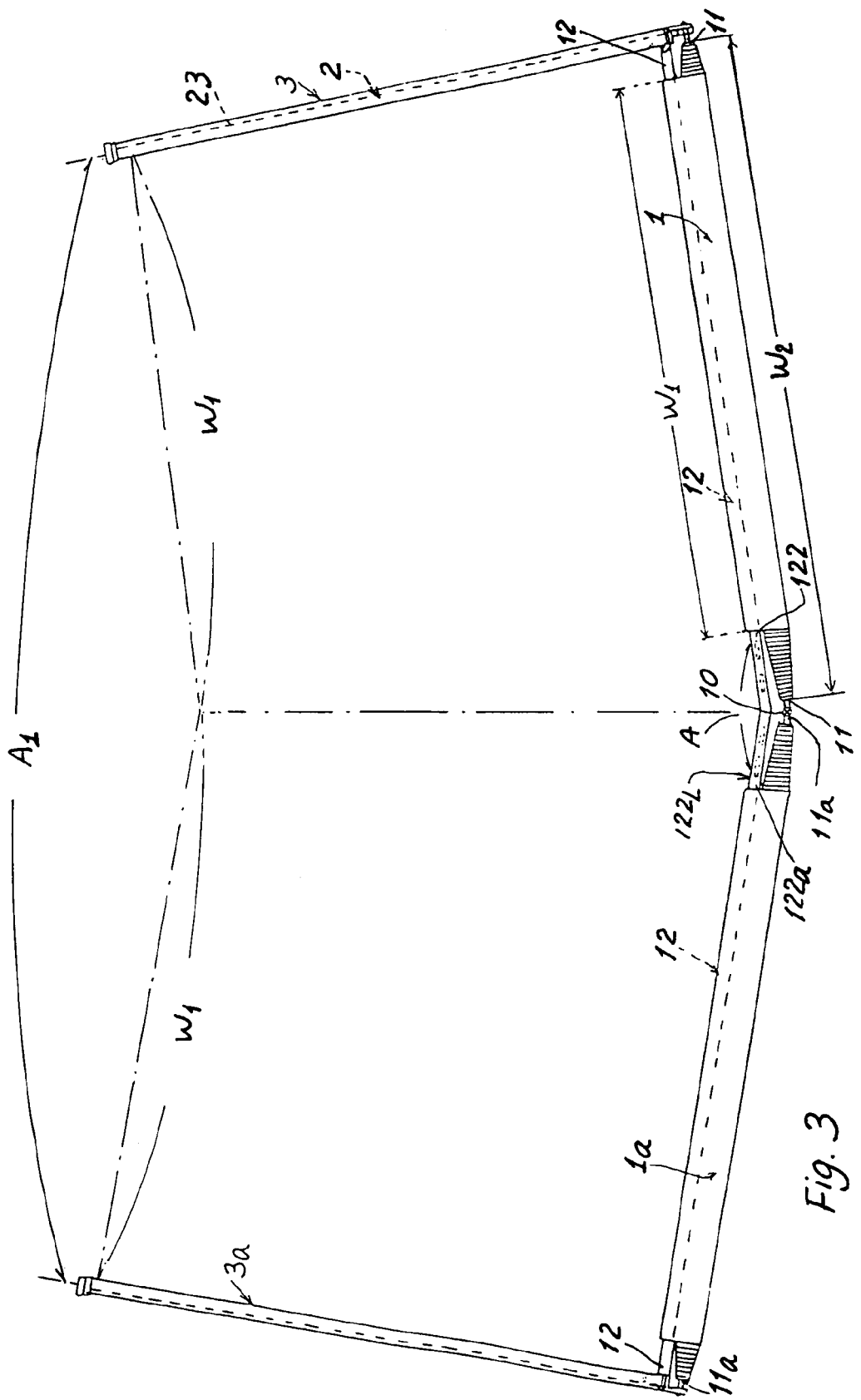
FIG. 3 shows the present invention when retracted and wound for unveiling the car windshield.

The upper hanger 12 includes: a hanger sleeve 121 secured to a sliding block 31 slidably held in the (right) guiding device 3 and also secured to the driving means 2 to be driven by the driving means 2; and a linking arm 122 (having rollers 122W rotatably secured thereon) slidalby engaged in the hanger sleeve 121, with the linking arm 122 forming a right linking arm of a sliding link 122L (which is consisting of a right and a left linking arm 122, 122a); whereby upon a downward moving of the upper hanger 12 as wound by the lower reel 11, the sliding link 122L will be slidably protruded outwardly from the hanger sleeve 121 as shown in FIGS. 1 and 3.

The guiding means 3 (which may be a right guiding means 3 and a left guiding means 3a) includes: a guiding column having a tracking groove 30 longitudinally formed through the guiding column, a sliding block 31 (having rollers 312 rotatably secured thereon) slidably engaging in the tracking groove 30 for movably guiding said curtain member, and a fixing plate 33 formed on an upper portion of the guiding column to be secured to an upper portion of the windshield W or other suitable locations in a car.

The driving means 2 includes: a driving motor 21, which is forwardly or reversely rotated, rotatably mounted in a motor holder 210 connected with the reel holder 112, a driving gear 22 coaxially secured with an axle 11x of the lower reel 11 and engaged with a motor gear 211 secured with a motor shaft of the driving motor 21, a chain 23 (or a chain having a plurality of balls connected in series, or a belt, etc.) respectively engaged with the driving gear 22 driven by the motor 21 and engaged with a follower gear 24 rotatably mounted on an upper portion of the guiding column of the guiding means 3; having the chain 23 secured with the upper hanger 12; whereby upon a forward rotation (R) of the driving motor 21 (FIG. 5) to forwardly drive the chain 23 upwardly (U), the upper hanger 12 of the curtain member 1 will be raised upwardly to unwind the curtain member 1 (to FIG. 2) to shield the windshield W from sunlight exposure; and upon a reverse rotation ($R_1$) of the motor 21, the lower reel 11 is reversely rotated to lower (Dn) and rewind the curtain member 1 (to FIG. 3).

Since the curtain member 1 is formed as a trapezoid shape having a shorter width ($W_1$) at its upper end portion and a longer width ($W_2$) at its lower end portion (FIGS. 2, 3), the curtain member 1 is retracted and wound as shown in FIG. 3 to "reveal" (or to protrude) the sliding link 122L having a right linking arm 122 slidably held in the right hanger sleeve 121 and having a left linking arm 122a slidably held in a left hanger sleeve 121a (not shown) because the two hanger sleeves 121, 121a are now separated for a distance to be generally equal to $2\times(W_2-W_1)$.

As provided by the two trapezoidal-shape curtain members 1, 1a, a car windshield W generally formed as trapezoidal shape will be effectively shielded by the present invention.

Figure 2:
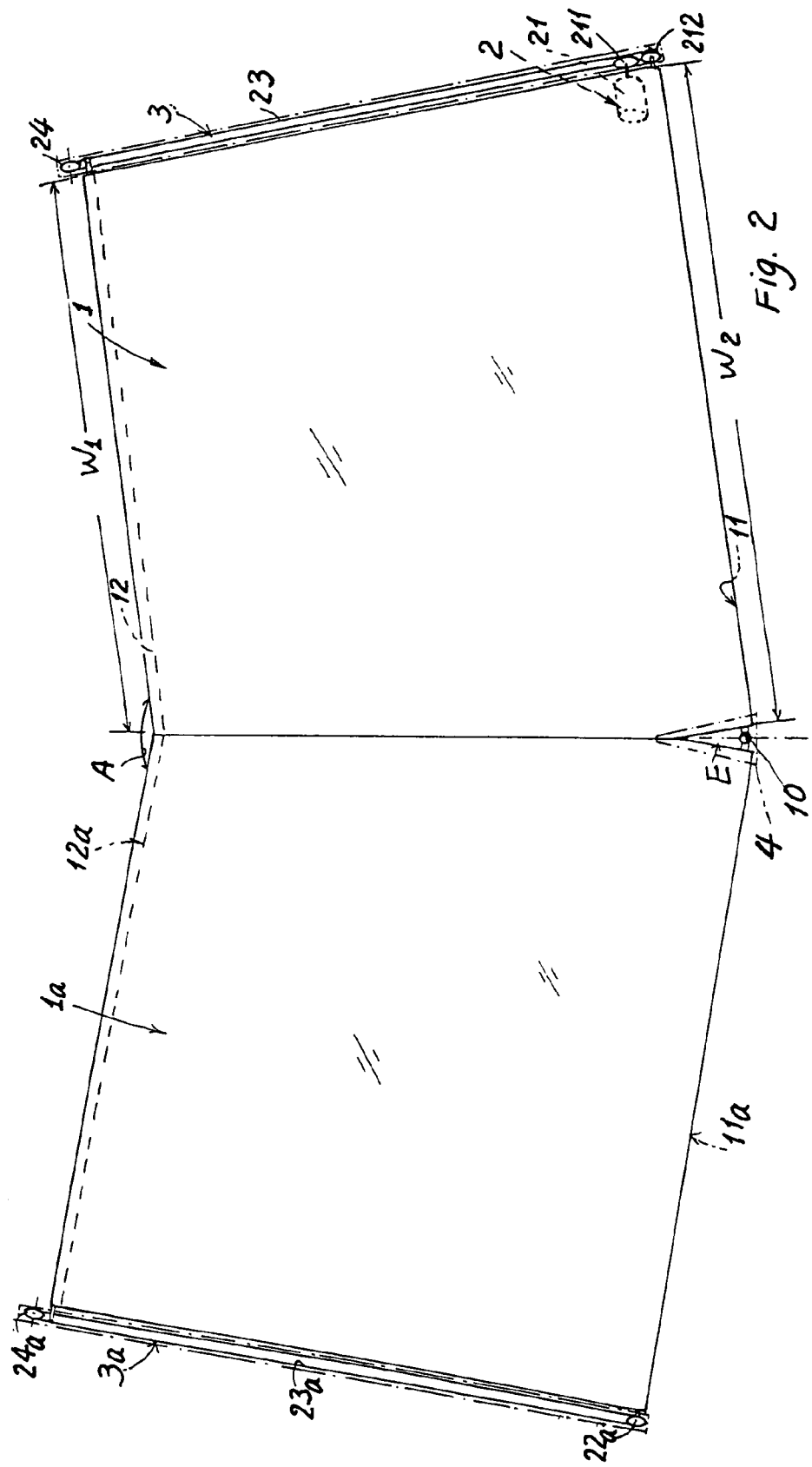
FIG. 2 is an illustration showing the car sunshade of the present invention when upwardly extended.

The two guiding columns of the two guiding means 3, 3a are slightly inclined to be interpolatively intersected to define an acute angle A1 as shown in FIG. 3, adapted to unwind the trapezoidal curtain members 1, 1a to effectively shield the trapezoidal windshield W as shown in FIG. 2.

Naturally, the two guiding columns of the two guiding means 3, 3a may also be parallel (not shown) with each other if the car windshield is generally formed as rectangular shape.

When the two curtain members 1, 1a are extended (FIG. 2) to shield the windshield, there is a triangular opening E existing between the two curtain members 1, 1a so that a decorative member 4 (dotted line shown) secured on the dashboard may be provided to cover this opening E for decorative purpose.

Figure 5:
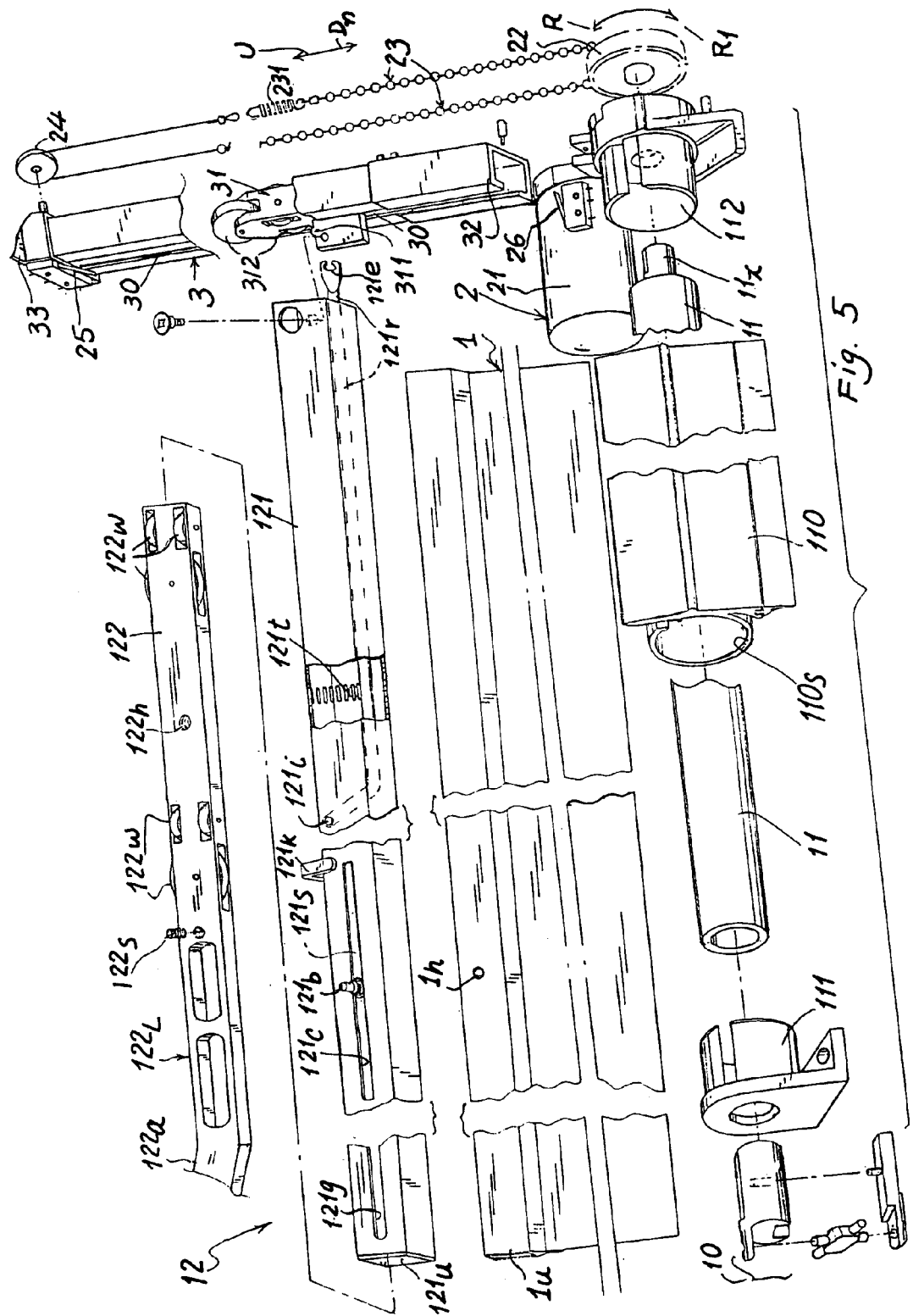
FIG. 5 is a partial exploded view to show the elements of the present invention.
Figure 6:
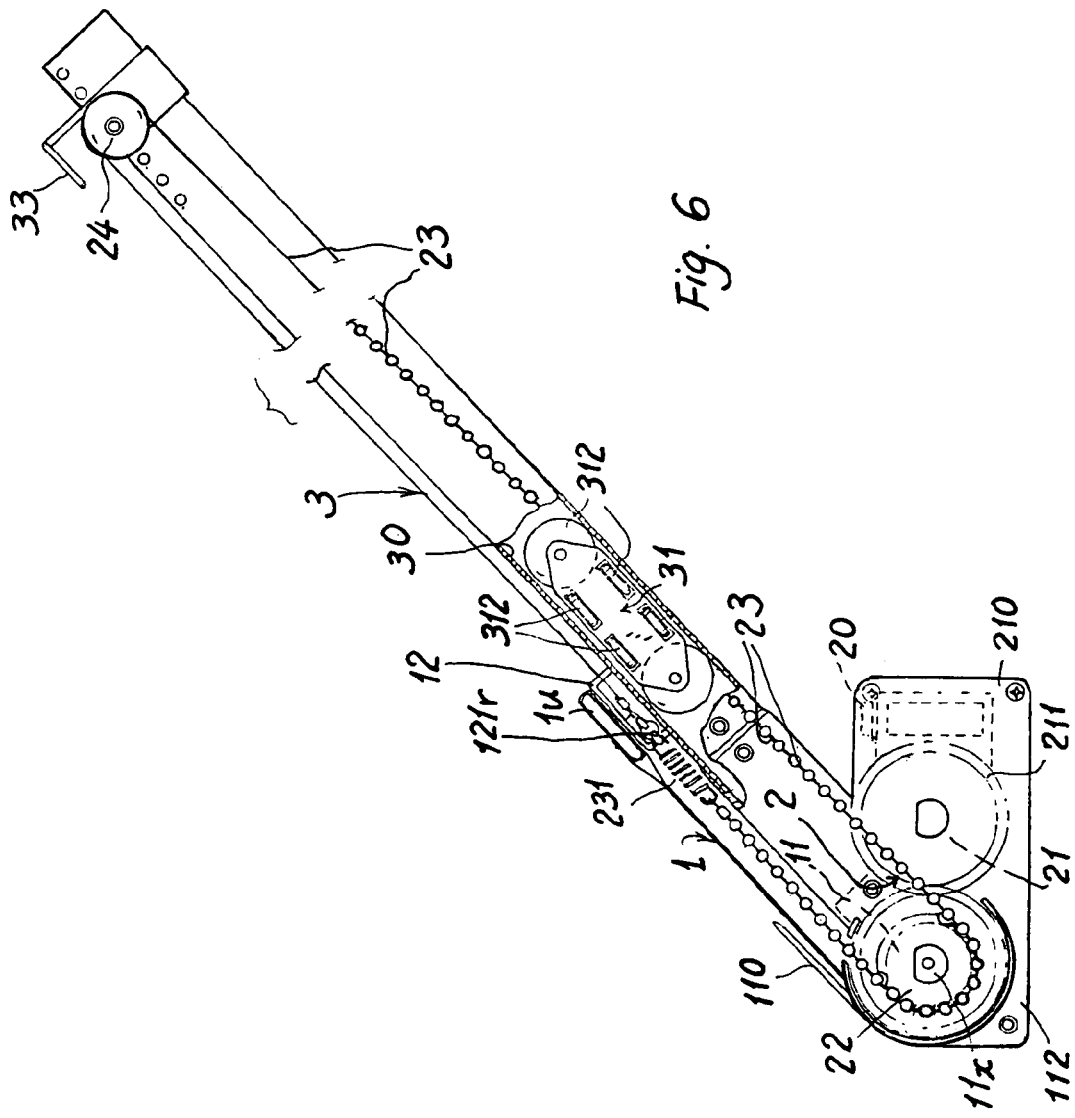
FIG. 6 shows the driving means and the guiding device of the present invention.

The upper hanger 12 includes a hanger rod 121r having a rod end 121e resiliently secured to the chain 23 of the driving means through a spring 231, having another rod end of the hanger rod 121r resiliently or pivotally secured to the hanger sleeve 121 by a pin 121i and a tension spring 121t secured to the hanger sleeve 121 (FIG. 5).

The linking arm 122 is slidably engaged with a channel 121u formed in the hanger sleeve 121 by fixing a bolt 122s on the linking arm 122, with the bolt 122s slidably engaged with a slot 121g cut through the hanger sleeve 121 (FIG. 5), thereby limiting the sliding engagement of the linking arm 122 on the hanger sleeve 121 without being released.

Figure 4:
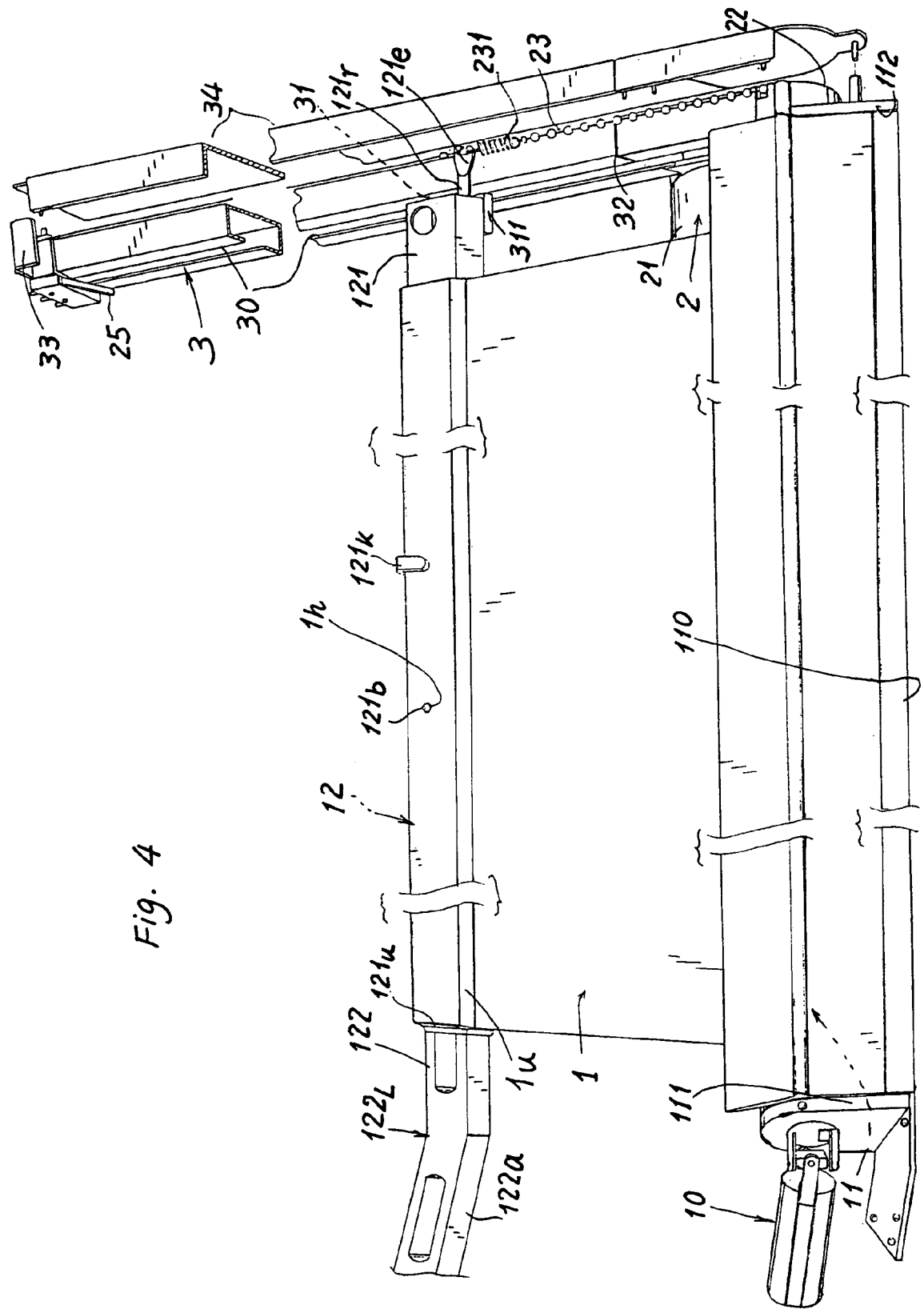
FIG. 4 is a perspective view for partially showing the present invention.

A hanging bolt 121b is fixed in a bolt hole 122h in the linking arm 122 and may be slidably engaged in a slot 121c formed in the hanger sleeve 121 (or the bolt 121b is secured in a sliding block 121s slidably engaged within the sleeve 121), with the bolt 121b protruded through a hanging hole 1h formed through an upper portion 1u of the curtain member 1 so that the curtain member 1 may be hanged on the upper hanger 12 to be upwardly raised U (FIGS. 5, 4 and 1). A hook 121k is provided on the upper hanger 12 for slidably holding said curtain member 1 stably.

The sliding engagement of the related parts of the present invention provides a smooth operation when unwinding or winding the curtain members 1, 1a as driven by the driving means 2. Meanwhile, the springs 231, 121t provided in this invention also enhance a smooth driving operation in order for smoothly raising the curtain member.

A switch 20 may be provided to operate the driving motor 21 to be forwardly rotated until an actuator 311 formed on the block 31 upwardly reaching an upper limit to actuate an upper micro switch 25 formed on an upper portion of the guiding means 3 for stopping the upward movement of the upper hanger 12 and the curtain member 1; or to operate the motor 21 to be reversely rotated until the actuator 311 downwardly actuating a lower micro switch 26 formed on a lower portion of the guiding means for stopping the reverse rotation of the motor 21 for completing the winding of the curtain member 1 by the reel 11.

An electric or electronic control circuit (not shown) may be provided in this invention for controlling the operation of the sunshade system in accordance with the present invention. The elements of the driving means 2 and the guiding column of the guiding means 3 may be protected by a cover 34 (FIG. 4).

Other modifications may be made without departing from the spirit and scope of the present invention.

The left curtain member 1a will be synchronously driven by the driving means 2 provided at the right guiding means 3 as linked to the right curtain member 1. Therefore, the left curtain member 1a has its upper hanger 12a secured to a chain 23a, which is respectively engaged with an upper idler 24a rotatably mounted on an upper portion of the left guiding means 3a and engaged with a lower idler 22a rotatably mounted on a lower portion of the left guiding means 3a. Since the left lower reel 11a is universally connected to the right lower reel 11, the left reel 11a will also be synchronously driven by the right reel 11 and the driving means 2. By the way, the left curtain member 1a may be synchronously raised or lowered as driven by the right curtain member 1 as driven by the driving means 2 provided at the right side portion of the present invention.

Naturally, the left curtain member 1a may also be driven by a left driving means (not shown) independently. Then, it will become a dual system including two driving means and two driving motors.

The present invention is superior to the prior art because it is designed adapted for a practical windshield formed as arcuate shape; adapted for mounting on a protruded (not flat) dashboard; and adapted for convenient installation directly in any car without removing the factory-installed rear-view mirror and without obstructing a tall driver's head.

I claim:

1. A car sunshade comprising:

a pair of curtain members adapted for shielding a right portion and a left portion of a car windshield when upwardly extended;

at least a driving means operatively driving said curtain members to be upwardly extended or unwound for shielding in the windshield, or operatively lowering said curtain members for retracting or winding the curtain members to be rested on a car dashboard adjacent to the windshield to unveil the windshield;

and two guiding means respectively disposed on opposite sides of the windshield having one said guiding means secured with said driving means, each said guiding means juxtapositioned to each windshield pillar, said guiding means movably guiding said curtain members upwardly or downwardly when driven by said driving means;

said curtain member including a lower reel rotatably mounted on the dashboard adjacent to the windshield having a lower portion of the curtain member secured to the reel, and an upper hanger secured to the driving means formed on one said guiding means for securing an upper portion of the curtain member;

two said curtain members universally coupled by a universal coupling for coupling two lower reels of the two curtain members to be simultaneously driven by the driving means;

each said lower reel rotatably mounted in a hollow sleeve secured on two reel holders disposed on opposite ends of the reel, having a first reel holder adjacent to the universal coupling, and having a second reel holder secured to a lower end portion of a guiding means; and said upper hanger including: a hanger sleeve secured to a sliding block slidably held in the guiding means and secured to the driving means to be driven by the driving means; and a linking arm slidalby engaged in the hanger sleeve, with the linking arm forming a right arm of a sliding link which consisting of said right linking arm and a left linking arm; whereby upon a downward moving of the upper hanger as wound by the lower reel, the sliding link will be slidably protruded outwardly from the hanger sleeve.

2. A car sunshade according to claim 1, wherein said lower reel further includes a decorative plate secured to said hollow sleeve for shielding the lower reel and the curtain member when wound or retracted into the hollow sleeve.

3. A car sunshade according to claim 1, wherein said guiding means includes: a guiding column having a tracking groove longitudinally formed through the guiding column, a sliding block slidably engaging in the tracking groove for movably guiding said curtain member, and a fixing plate formed on an upper portion of the guiding column to be secured to an upper portion of the windshield.

4. A car sunshade according to claim 1, wherein said driving means includes: a driving motor, which is forwardly or reversely rotated, rotatably mounted in a motor holder connected with a reel holder of the lower reel, a driving gear coaxially secured with an axle of the lower reel and engaged with a motor gear secured with a motor shaft of the driving motor, a chain respectively engaged with the driving gear driven by the motor and engaged with a follower gear rotatably mounted on an upper portion of the guiding column of the guiding means; having the chain secured with the upper hanger; whereby upon a forward rotation of the driving motor to forwardly drive the chain upwardly, the upper hanger of the curtain member will be raised upwardly to unwind the curtain member to shield the windshield from sunlight exposure; and upon a reverse rotation of the motor, the lower reel is reversely rotated to lower and rewind the curtain member.

5. A car sunshade according to claim 1, wherein said curtain members include a decorative member secured to a dashboard to shield an opening formed between the two curtain members when extended.

6. A car sunshade according to claim 1, wherein said upper hanger has a hanger rod resiliently secured to a chain of the driving means through a spring, having a rod end of the hanger rod resiliently pivotally secured to the hanger sleeve by a pin and a tension spring secured to the hanger sleeve.

7. A car sunshade according to claim 1, wherein said linking arm is slidably engaged with a channel formed in the hanger sleeve by fixing a bolt on the linking arm, with the bolt slidably engaged with a slot cut through the hanger sleeve, thereby limiting the sliding engagement of the linking arm on the hanger sleeve without being released.

8. A car sunshade according to claim 1, wherein said upper hanger includes a hanging bolt formed thereon for hanging said curtain member on said bolt of said hanger; having a hook formed on said upper hanger for slidably holding said curtain member stably.

9. A car sunshade according to claim 4, wherein said driving means includes a switch operatively actuated to operate the driving motor to be forwardly rotated until an actuator formed on the sliding block upwardly reaching an upper limit to actuate an upper micro switch formed on an upper portion of the guiding means for stopping the upward movement of the upper hanger and the curtain member; or operatively actuated to operate the motor to be reversely rotated until the actuator downwardly actuating a lower micro switch formed on a lower portion of the guiding means for stopping the reverse rotation of the motor for completing the winding of the curtain member by the lower reel.

* * * * *